Dec. 26, 1961     G. T. McCONNELL     3,014,371
TEMPERATURE MEASURING AND INDICATING MEANS
Filed Feb. 3, 1958     3 Sheets-Sheet 1

INVENTOR.
GEORGE T. McCONNELL
BY

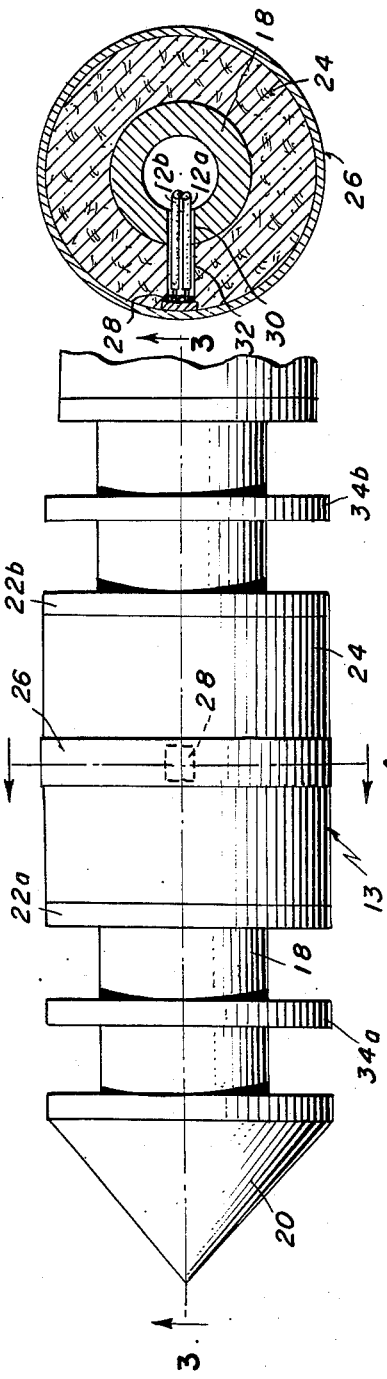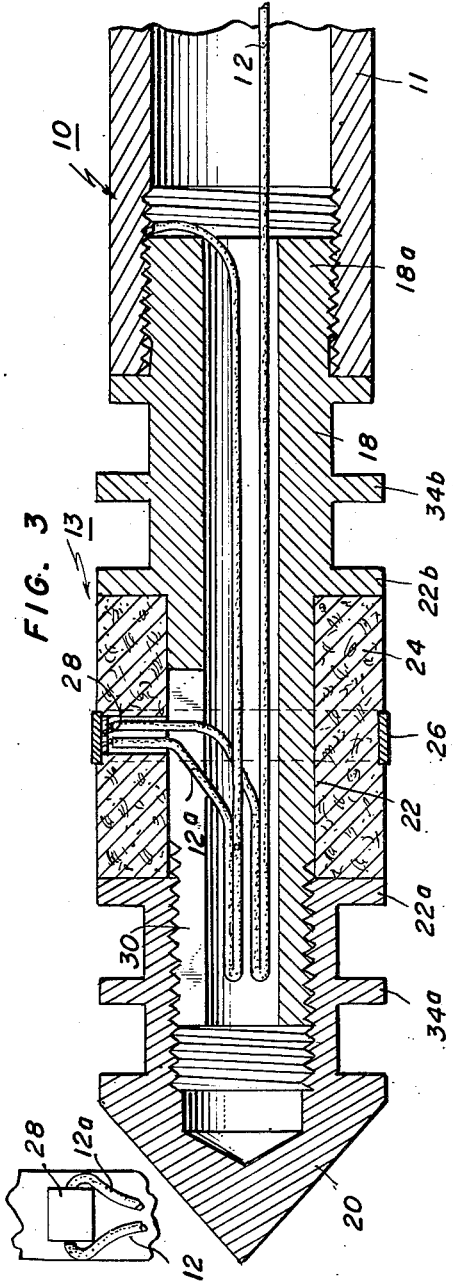

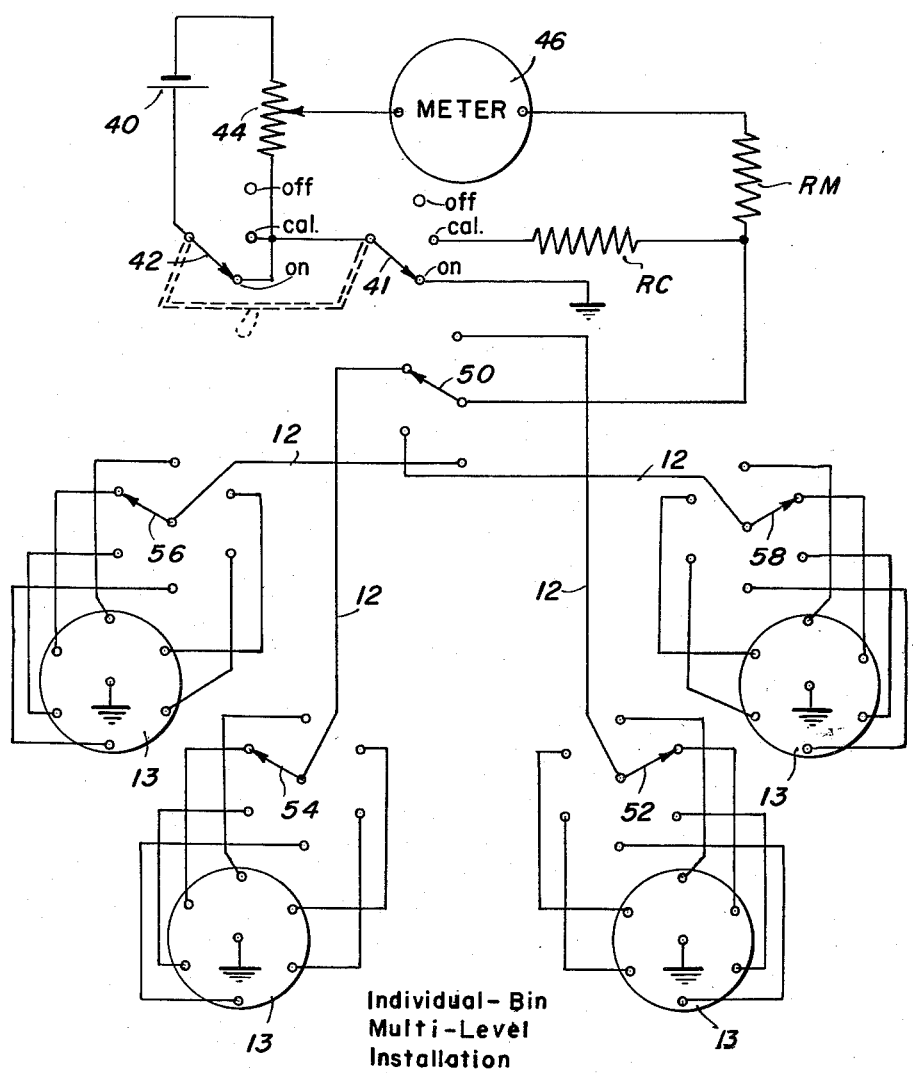

a# United States Patent Office 3,014,371
Patented Dec. 26, 1961

3,014,371
TEMPERATURE MEASURING AND INDICATING MEANS
George T. McConnell, Millington, Tenn., assignor to Tell-Tronics Products, Inc., Memphis, Tenn.
Filed Feb. 3, 1958, Ser. No. 712,762
5 Claims. (Cl. 73—362)

This invention relates to temperature measuring and indicating means, and is more particularly directed to improved means for checking the temperature obtaining within masses of grains, seeds and fertilizers, and other bulk and/or combustible materials in storage and for indicating same at a distance, the present application for patent on said invention being a continuation-in-part of my earlier application, Serial No. 520,397, filed July 7, 1955, now Patent 2,919,580, dated January 5, 1960.

As explained in my aforesaid application, there are numerous bulk or granular materials whose internal temperature during storage must be carefully monitored to guard against spoilage or spontaneous combustion. To cite an example and not by way of limitation, it is well known that when rice is stored in bins its internal temperature, i.e., the temperature obtaining within the mass or body of the rice, becomes an important factor both in preserving the germinating properties of the rice and in protecting it against fermentation. Such follows from the fact that when stored in bins rice (which has been previously dried at a closely controlled temperature) has a tendency to "sweat" with changes in outside temperature and humidity. These sweating periods are dangerous because, with rice, a high moisture content is accompanied by a rise in temperature which can be sufficiently great as to cause the rice to ferment and thereupon to become useless.

With other grains in storage a temperature rise is usually accompanied by a rise in moisture content. Therefore, periodic measurement of the internal temperatures of such grains gives an indication of the relative condition thereof in terms of this moisture content. Thus, it is customary practice for commercial mills and grain elevators to log the internal temperature of grains stored in their bins at regular intervals, say every twenty-four hours, and, as the temperature of a certain bin may rise to an unsafe level (950° in the case of rice), to put grains stored therein through a drier to remove the excess moisture.

However, so far as I have been able to determine, there is on the market no temperature measuring and indicating device suited, as respects its self-contained construction and portability, to the needs of the individual farmer in monitoring the temperatures of his grains in storage. Furthermore, the permanently installed temperature monitoring and indicating means as heretofore used by commercial mills and elevators to periodically log the temperature of the grains stored in its bins as aforesaid leave much to be desired in terms of accuracy of measurement and simple and efficient construction.

Stated broadly, a main object of the present invention is the provision of an improved, simplified and highly effective means for checking on the internal temperature of masses of bulk (granular or pulverized) material in storage in bins, piles or the like.

A further object of the invention is the provision of a portable instrument-type of means for measuring the internal temperature of materials such as grains, seeds or the like under storage in bins, thus enabling the individual farmer (owner) to monitor his own bins at regular intervals suited to his convenience or to the particular material or materials in storage.

Yet a further object of the invention is the provision of a portable temperature measuring and indicating means as last stated which is of self-contained construction, thus enabling its use on farms whose storage bins may be remotely located from a power supply, for example.

Another object of the invention is the provision of temperature measuring and indicating means of the stated character, which combines a temperature measuring element in the form of a probe capable of being inserted by hand into masses of grains and like materials in storage bins, with a temperature indicator in the form of a meter, which latter may be located remotely from the probe.

A more particular object of the invention is the provision of an improved temperature-sensing probe tip capable of accurately sensing the internal temperature of grains and like materials in bins, piles and the like when inserted or buried in said materials.

The above and other objects and advantages of a temperature measuring and indicating means according to the invention will appear from the following detailed description thereof, reference being had to the accompanying drawings wherein:

FIG. 2 is a broken-away enlarged view of the improved sensing tip of the probe shown in FIG. 1;

FIG. 3 is a longitudinal section taken along line 3—3 of FIG. 2;

FIG. 4 is a section taken through the tip on line 4—4 of FIG. 2;

Figure 1:
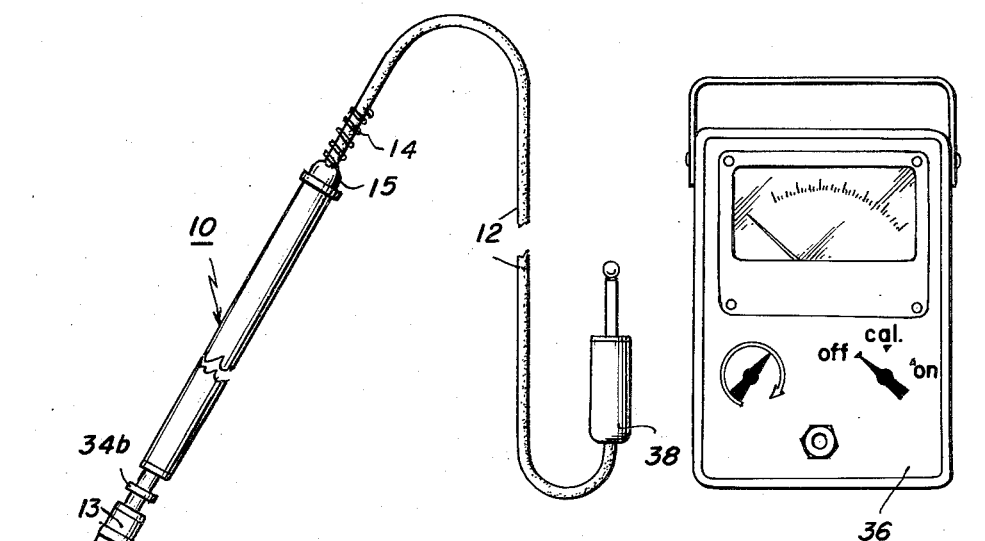
FIG. 1 is a plan view of a portable self-contained temperature measuring and indicating means according to the invention, the temperature sensitive probe member thereof being shown unplugged from the meter or indicator component of said means.
Figure 5:
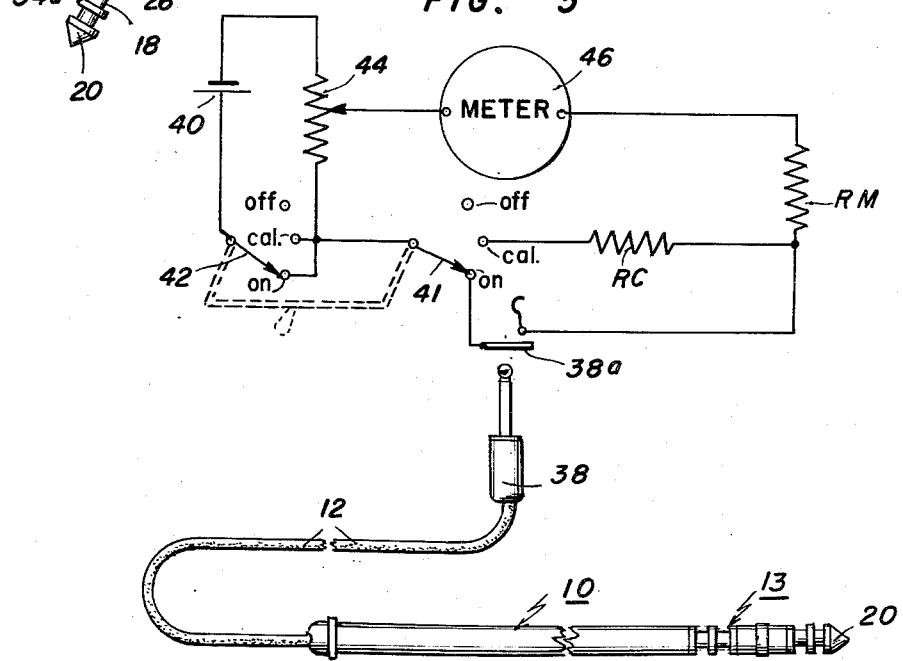

FIG. 4-A is a detail view illustrating the electrical connections to the thermistor constituting the temperature-sensitive element per se:

FIG. 5 is a circuit diagram of the meter and temperature-sensitive probe member components of the temperature measuring and indicating means as illustrated in FIG. 1; and FIG. 6 is a circiut diagram of a console-type temperature indicator or meter electrically connected to and servicing different-level temperature sensitive tips permanently mounted in a plurality of storage bins or elevators.

Referring to FIGS. 1–5 exemplary of a portable probe-type temperature measuring and indicating instrument according to the present invention, reference numeral 10 generally indicates a portable probe member capable of being inserted by hand into a mass or pile of bulk material, such as grain in storage, and which preferably comprises a length of cadmium-plated iron pipe 11 (⅝" O.D.) enclosing a single lead, rubber-sheathed cable 12 extending to a temperature sensitive probe-tip generally designated 13, affixed to one end of said pipe as by threads so as to project beyond same. A coil spring 14 disposed to encircle the cable 12 as it enters the pipe and serving to protect said cable against the effects of sharp bending is connected to the other end of the pipe 11 as by a cap 15 which also closes off and seals said other end. An internal cable clamp (not shown) which may be locked in place by the cap prevents the cable 12 from being pulled away from the pipe 11.

FIGS. 2–4 inclusive illustrate in detail the improved temperature sensing probe-tip to which the present invention is largely directed. As shown such comprises a short-length tubular tip body 18 of good heat conductive metal such as aluminum, whose rear end 18a is screw-threaded into the bore of the forward end of the aforesaid probe member proper, i.e., the pipe 11, and whose forward end is formed by a threaded-on pointed cap 20 also of aluminum which closes off the free or front end of both the probe pipe 11 and the tip body 13. Intermediate its ends, the tip body is formed with an outwardly opening circumferential channel or groove 22 defined at its ends as by axially spaced radial flanges or ribs 22a, 22b, extending from the tip body, and in this channel is placed an insert of cork or similar heat insulating material in the form of a collar 24 extending the full 360° circumference of the tip body.

Firmly affixed to the outer peripheral surface of the cork insert 24 by any appropriate means (not shown) is a narrow-width and relatively thin ring 26 of metal characterized by its high heat conductivity, such as brass. Secured in close physical contact to the inner surface of the brass ring 26, as by soldering, is a temperature sensing element in the form of a so-called thermistor 28 whose characteristics will be described hereinafter. As best seen in FIGS. 3 and 4, communication between the thermistor 28 and the bore of the tip body 13 is effected by means of an axial slot 30 cut through the wall of the tip body and a hole 32 in the cork insert 24, both the slot and the hole being in radial registry with the thermistor. Such communication provides for the electrical connection of the aforesaid lead-in cable 12 with the thermistor 28, it being observed that the thermistor is connected in series to the end of the single lead of the cable 12 which extends into the probe tip bore and to the corresponding end of a short-length return lead designated 12a whose other end is electrically connected as by soldering to the front end of the probe member or pipe 11 whereby the latter serves throughout its length as the return lead companion to the aforesaid single-lead cable 12.

Intermediate the cork insert 24 and the pipe end to which it connects, and also intermediate said insert 24 and the cap 20, the tip body 13 and its pointed end 20 may be provided with one or more radial ribs 34a, 34b which, as do the aforesaid flanges 22a, 22b serve to dissipate any heat or cold flowing to the aluminum tip body from the cast-iron pipe 11 constituting the probe member proper, the ribs thus speeding up heat balance between the probe and the surrounding grain mass.

As seen in FIG. 1, a temperature sensitive probe 10 is adapted to be plugged into and thereby electrically connected to a portable electrical indicator or meter generally designated 36 and which is preferably of the type giving a temperature reading on its face directly in degrees Fahrenheit. To enable the probe to be plugged into and disconnected from the meter at will, the cable 12 terminates in a plug 38 and the meter is provided with a jack or receptacle 38a (FIG. 5) therefor. It is a feature of the invention that the meter 36 suitably mounts and encloses the source of power required to energize the device, so that it is not only portable but also it is fully self-contained and hence may be used in locations removed from a conventional power source.

The electrical construction of the meter 36 will be seen from FIG. 5, such being a circuit diagram thereof. The source of power is a single 1.5-volt standard flashlight cell 40 and, when the switches 41 and 42 (which are ganged to change position simultaneously) are in the "On" position, the output of the battery is fed through a calibrating potentiometer 44, thence through the 0–1 milliameter 46, thence through resistance RM (which represents the meter resistance), thence through jack 38a and plug 38, thence through cable 12 (which has twin leads between jack and probe) to the thermistor 28 located in the probe head 13, thence through the return lead 12a, pipe 11, and jack, thence through the aforesaid switches 41 and 42, and back to the positive side of the battery. Means are also provided to calibrate the meter when the switches 41 and 42 are moved to the "Cal," i.e. calibrating, position, in which the probe 10 is cut out of the circuit and a calibrated resistor RC is substituted in series therefor. Calibrated resistor RC is a wire wound resistor whose selected resistance of 735 ohms, plus or minus 1%, represents the resistance of the type thermistor used, at 90° F. When switches 41 and 42 are in the "Cal" position aforesaid, current flow is from battery 40 through calibrating potentiometer 44, thence through meter 46, thence through meter resistance RM, thence through calibrating resistor RC, thence through switches 41 and 42, to the other side of the battery. With current flowing as above, the potentiometer is adjusted for the proper current flow in the circuit. When switches 41 and 42 are switched to the "Off" position, all power is removed from the circuit.

Illustratively, the thermistor 28 is of a type whose resistance decreases substantially linearly from 2580 to 372 ohms with increase in thermistor temperature from 40° F. to 120° F. Such a thermistor has a negative temperature coefficient and changes resistance at an exponential rate. The tolerance of the components used in the FIG. 5 circuit are designed to give an accuracy of plus or minus 1% from 70° F. to 110° F.

The aforesaid probe 10 is shown to have a fixed length (6 feet for example) but its length may be extended in increments either by coupling additional lengths thereto as desired, or by initially providing the probe with sectional construction capable of extension by adding sections. In either case, the probe will be provided with suitable coupling means for effecting both mechanical and electrical connections, between probe proper and added lengths, or between probe sections when the probe is of sectional construction.

In use, the probe 10 is capable of being readily inserted by hand into a mass of grain or similar material in storage in piles, bins and the like, with assurance that its temperature sensing tip 13 will sense heat areas therein (which usually indicate high moisture spots but which may also indicate insect infestation, concentration of trash and foreign matter, etc.) and visually record same on the meter 36.

Consequent to the unique construction of the probe tip, not only is a positive and accurate temperature measurement achieved, but also changes of temperature are sensed more rapidly than was possible heretofore, due to the isolation of the brass ring 26 which carries the thermistor 28 from the tip body 18 by means of the cork insert 24 serving as a heat barrier between thermistor and tip body, with the result that the response of the thermistor to change of temperature is unaffected by the much slower rate of response of the tip body to any such temperature change. Being of light weight construction, both probe and meter components may be carried about by hand and assembled as needed at desired check points. Thus, temperature checking and indicating equipment according to this invention is well adapted to the needs of the individual farmers, bin owners and storage pile owners who by the use thereof are enabled not only to check the temperature obtaining within the mass of grain or other material owned or supervised by them, but also to do so more accurately and thoroughly than heretofore, and more cheaply as well, since the services of but one man working but a fraction of the time necessary with the prior equipment is required.

In addition to serving in highly satisfactory manner as a fully portable temperature checking and indicating means, i.e. one which is movable from bin to bin, such means may also be used much as a permanent installation, as by leaving a probe member 10 or at least its temperature sensitive tip 13 buried in the material of a bin, and electrically connecting the meter 36 thereto when a temperature reading is desired. In case a plurality of small storage bins are involved, one probe or tip per bin will probably suffice together with a single meter 36 connected to service all of the probes in succession or in any desired order. However, for large bins, commercial mills, grain elevators, etc. a permanent installation as just described, but which employs a plurality of temperature sensing tips 13 mounted as to a pipe or the like at different elevations within each bin or elevator so as to sense the temperature obtaining at corresponding levels of the grain or other material in storage therein, together with a console type of indicating meter and appropriate electrical connections to the individual sensing tips of the plurality of bins or elevators, is recommended.

Such an arrangement is diagrammatically shown in FIG. 6, from which it will be seen that the meter circuit is essentially the same as that illustrated in FIG. 5, the difference being that instead of being provided with a receptacle for a plug such as the previously described plug 38, it instead incorporates a multiple-contact switch 50 for selectively connecting the plurality of temperature sensitive tips 13 of the several bins or elevators to the meter; and it also includes multiple-contact switches 52, 54, 56, 58, one for each individual bin or elevator, for selecting the level of an individual bin or elevator at which a temperature reading is to be taken. While four bin or elevator switches and the contacts and connections for readings at six levels per bin or elevator have been illustrated, it will be understood that such is given for disclosure purposes and not by way of limitation.

From the above, it will be clear that the temperature measuring (checking) and indicating means as illustrated and described achieves the objectives of the present invention as earlier explained. However, as many changes could be made in carrying out the above constructions without departing from the scope of the invention, it is intended that all matter contained in the above description or shown in the accompanying drawings shall be interpreted as illustrative and not in a limiting sense.

I claim:
1. Electrical means for measuring and remotely indicating the temperature obtaining within a mass of grain and similar bulk materials, comprising a portable elongated probe member adapted to be inserted by hand into said mass of material and including a probe tip of good heat-conductive metal, a member of high heat conductive metal disposed in encircling relation on said tip and being in direct heat exchange relationship with said mass, a thermistor affixed to said member internally thereof so as to be encased thereby, an annular spacer of cork-like material disposed intermediate said probe tip and the member and isolating the thermistor against heat and/or cold transference thereto from the probe member, an electrical circuit including said thermistor and means located remote from said thermistor and externally of the mass for indicating change of current flow in said circuit.

2. Electrical measuring and indicating means as set forth in claim 1, wherein said probe tip comprises a tubular tip body affixed to the end of said probe member, said thermistor-mounting member comprises a brass ring which encircles said body and to the inner side of which the thermistor is secured, and said spacer comprises a band of cork-like material encircling the tubular tip body and spacing the ring and the thermistor outwardly from said tip body.

3. Electrical means for measuring and remotely indicating the temperature obtaining within a mass of grain and similar bulk materials comprising a portable elongated probe member adapted to be inserted by hand into said mass of material, a heat sensing probe tip affixed to the working end of said member, said tip comprising a tip body of good heat conductive metal, a member fashioned of high heat-conductive metal encircling the tip body but being spaced radially outwardly therefrom, a thermistor encased within said heat-conductive member and being in direct heat exchange relationship therewith, an annular heat insulating means interposed between and spacing said heat conductive member and thermistor from the tip body and serving to prevent any heat and/or cold transference from said tip body to the thermistor, an electrical circuit including said thermistor, and means located remote from said thermistor and externally of said mass for indicating change of current flow in said circuit.

4. Electrical means for measuring and remotely indicating the temperature obtaining within a mass of grain and similar bulk materials such as set forth in claim 3, wherein said tip body has tubular form, said heat conductive member comprises a ring of brass encircling the tip body, and the heat insulating means comprises a collar of cork-like material affixed to and also encircling the tip body and being disposed radially intermediate said body and said ring.

5. Electrical means for measuring and remotely indicating the temperature obtaining within a mass of grain and similar bulk materials such as set forth in claim 3 wherein said tip body has tubular form, said heat conducting member comprises a ring of brass encircling the tip body, the heat insulating means comprises a collar of cork-like material affixed to and also encircling the tip body and being disposed radially intermediate said body and said ring, and said tip body is provided with heat dissipating ribs serving to speed up the desired condition of heat balance between the probe as a whole and the grain mass as in turn makes for a faster and more accurate temperature measurement, two adjacent ribs defining a circumferential channel receiving said annular heat insulating means.

References Cited in the file of this patent
UNITED STATES PATENTS

| | | |
|---|---|---|
| 1,224,385 | Kennedy | May 1, 1917 |
| 1,363,267 | Porter | Dec. 28, 1920 |
| 2,025,534 | Sheard | Dec. 24, 1935 |
| 2,342,827 | Ackers | Feb. 29, 1944 |
| 2,473,627 | Wickizer et al. | June 21, 1949 |
| 2,676,489 | Basham | Apr. 27, 1954 |
| 2,685,798 | Goble | Aug. 10, 1954 |
| 2,878,355 | McDonald | Mar. 17, 1959 |
| 2,925,572 | Boddy | Feb. 16, 1960 |

OTHER REFERENCES

Ser. No. 342,488, Martienssen (A.P.C.), published May 4, 1943.